United States Patent
Tarcy et al.

[11] Patent Number: 5,932,375
[45] Date of Patent: Aug. 3, 1999

[54] FORM CHARGING ALUMINUM-LITHIUM BATTERY CELLS

[75] Inventors: Gary P. Tarcy, Murrysville; Michael L. Slaugenhaupt, Apollo, both of Pa.

[73] Assignee: Aluminum Company of America, Pittsburgh, Pa.

[21] Appl. No.: 08/974,570

[22] Filed: Nov. 19, 1997

Related U.S. Application Data

[60] Provisional application No. 60/038,092, Feb. 18, 1997.

[51] Int. Cl.$^6$ .............................. H01M 4/40; H01M 4/46
[52] U.S. Cl. ..................................... 429/231.95; 429/221
[58] Field of Search .......................................... 429/231.95

[56] References Cited

U.S. PATENT DOCUMENTS

| | | | |
|---|---|---|---|
| 3,957,532 | 5/1976 | Settle et al. | 136/75 |
| 4,056,885 | 11/1977 | Rao | 29/623.1 |
| 4,158,720 | 6/1979 | Kaun | 428/567 |
| 4,324,846 | 4/1982 | Kaun et al. | 429/112 |
| 4,489,143 | 12/1984 | Gilbert et al. | 429/103 |
| 4,690,840 | 9/1987 | Gauthier et al. | 427/436 |
| 4,869,977 | 9/1989 | Connolly et al. | 429/101 |
| 4,874,680 | 10/1989 | Koshiba et al. | 429/197 |
| 5,316,875 | 5/1994 | Murai et al. | 429/194 |
| 5,474,861 | 12/1995 | Bito et al. | 429/194 |
| 5,498,489 | 3/1996 | Dasgupta et al. | 424/152 |

*Primary Examiner*—Maria Nuzzolillo
*Assistant Examiner*—Mark Ruthkosky
*Attorney, Agent, or Firm*—David W. Pearce-Smith

[57] ABSTRACT

A novel aluminum-lithium negative electrode and method for making such a novel aluminum-lithium negative electrode, including providing an admixture of aluminum powder and lithium halide electrolyte salts to form an aluminum lithium halide mixture, pressing the aluminum lithium halide mixture to form an aluminum lithium halide mixture negative electrode, placing the aluminum lithium halide mixture negative electrode next to a separate electrode composed of MgO and lithium halide electrolyte salts, providing a positive electrode of iron sulfide, lithium carbonate, and carbon, assembling the electrodes into a battery, and reacting lithium carbonate, carbon, and aluminum in situ in the battery to form an aluminum-lithium alloy negative electrode.

9 Claims, 1 Drawing Sheet

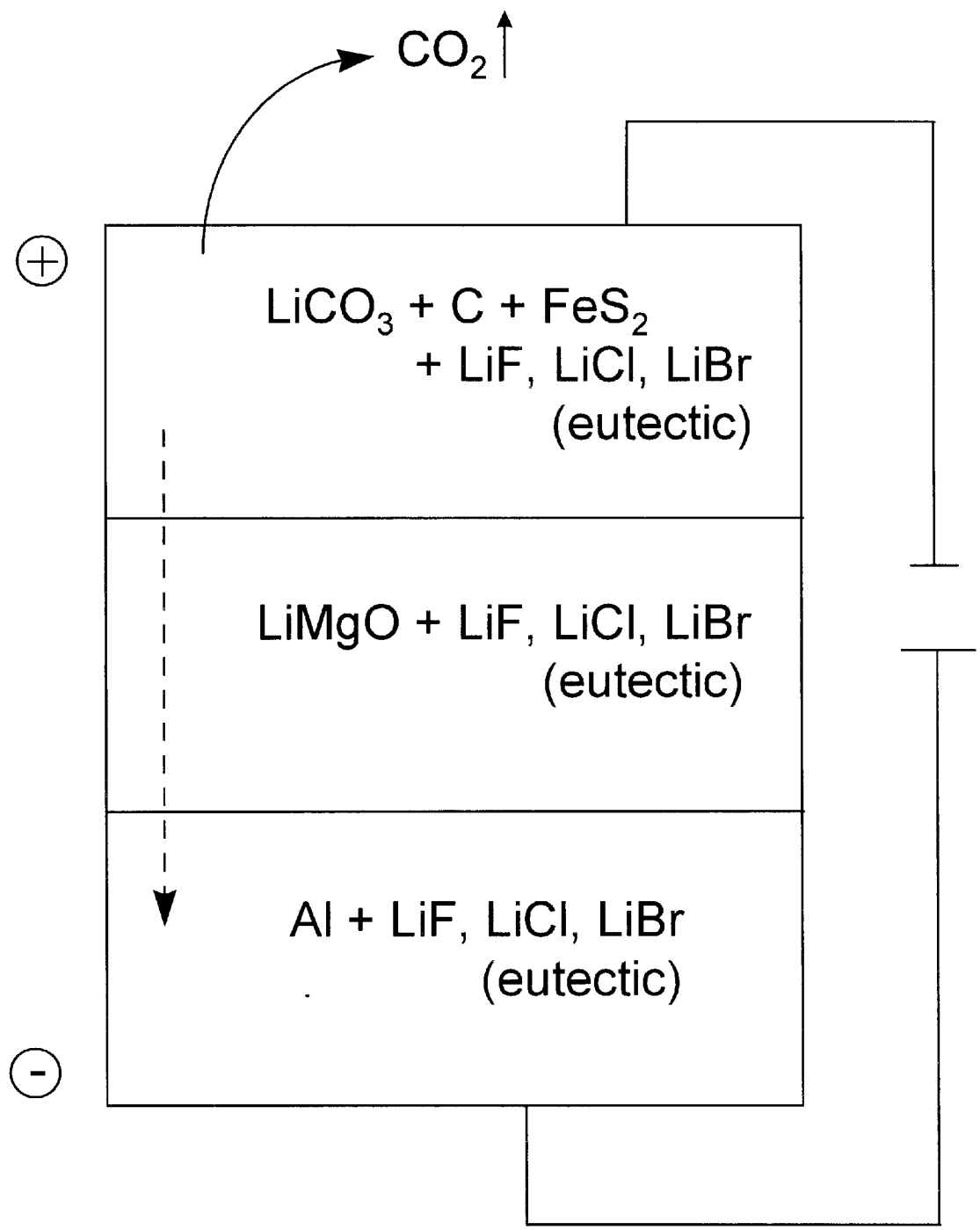
FIGURE

FORM CHARGING ALUMINUM-LITHIUM BATTERY CELLS

CROSS REFERENCE TO RELATED APPLICATIONS

This application claims the benefit of U.S. Provisional Application Serial No. 60/038,092, filed Feb. 18, 1997.

TECHNICAL FIELD OF THE INVENTION

The present invention relates to aluminum-lithium battery cells and, in one aspect, to apparatus and method for providing a novel aluminum-lithium negative electrode. In one aspect, this invention relates to apparatus and method for forming aluminum-lithium negative electrodes in-situ.

BACKGROUND OF THE INVENTION

Safe and efficient energy storage is a high priority concern today, especially for applications such as electric vehicles and the large scale storage of electric energy to level the load of stationary power plants.

Major improvements in the amount of energy stored per unit weight or volume, at reasonable costs, do not appear to be forthcoming from systems that employ aqueous electrolytes.

Lithium-based battery cells are being pursued currently because lithium is very electropositive and is light in weight. In such lithium-based battery cells, the negative electrode is a lithium alloy, usually aluminum-lithium, the positive electrode is an iron sulfide, and the molten salt electrolyte is a eutectic composition of lithium fluoride, lithium chloride, and lithium bromide. Because of the high melting points of such salts, operation is normally in the temperature range of about 350–500° C.

Electrochemical battery cells using aluminum-lithium negative electrodes are being developed to provide high current and capacity densities, high specific power, and long cycle life. Such cells have application in batteries for powering an electric vehicle or for the storage of electric power generated by electric utilities during periods of off-peak usage. Such electrochemical battery cells using aluminum-lithium negative electrodes also are being developed as replacements for conventional batteries, particularly for applications where high voltage, high capacity, and long shelf life are required. Unlike some conventional batteries, such as nickel cadmium batteries, or even lead acid batteries, which include component materials that may adversely affect the environment, lithium battery cells use component materials which are substantially less harmful.

Although lithium battery cells have numerous advantages over conventional batteries, the high chemical reactivity of lithium has caused problems in the fabrication and safe operation of the cells. For example, lithium is highly reactive with water and if brought into contact with water, will ignite. Lithium also can be unstable when in contact with cell electrolytes. Moreover, after prolonged use, a lithium cell can become unsafe because of the formation of lithium dendrites which can cause shorting within the cell.

INTRODUCTION TO THE INVENTION

Currently, the cost of lithium in aluminum-lithium alloys for aluminum-lithium-iron sulfide batteries is a major cost barrier.

In conventional processes, the lithium is metallurgically added to the aluminum metal and comes from the electrolysis of lithium chloride.

High lithium contents are required, e.g., such as on the order of 20–30% by weight, making handling of the electrodes hazardous and costly.

The aluminum-lithium alloy also is produced by a splat and grind procedure, and the electrodes are produced in a "dry glove box" environment.

All of these barriers lead to lithium being a major cost source for the aluminum-lithium-iron sulfide battery.

It is an object of the present invention to provide a novel aluminum-lithium-iron sulfide battery which is safe.

It is an object of the present invention to provide a novel aluminum-lithium-iron sulfide battery which is significantly less expensive than that produced by conventional methods available today.

It is an object of the present invention to provide a novel aluminum-lithium-iron sulfide battery wherein the lithium is introduced into the negative electrode in situ.

It is an object of the present invention to provide a novel aluminum-lithium-iron sulfide battery wherein the battery can be kept in a discharged state until its initial use.

These and other objects of the present invention will become apparent from the detailed description which follows.

SUMMARY OF THE INVENTION

The present invention includes novel apparatus and method for providing an admixture of aluminum powder and lithium halide electrolyte salts to form an aluminum lithium halide mixture, pressing the aluminum lithium halide mixture to form an aluminum lithium halide mixture negative electrode next to a separate electrode composed of MgO and lithium halide electrolyte salts, providing a positive electrode of iron sulfide, lithium carbonate, and carbon, assembling the electrodes into a battery, and reacting lithium carbonate, carbon, and aluminum in situ in the battery to form an aluminum-lithium alloy negative electrode and carbon dioxide gas.

BRIEF DESCRIPTION OF THE DRAWING

The sole FIGURE shows a schematic diagram of the starting composition and schematic of reaction of the novel process in accordance with the present invention.

DETAILED DESCRIPTION

In accordance with the present invention, aluminum powder and the electrolyte salts are mixed and cold pressed together to form an initial negative electrode of aluminum and lithium halide mixture. The negative electrode then is placed next to a separate electrode composed of magnesium oxide and electrolyte salts. The positive electrode is composed of iron sulfide of FeS or $FeS_2$, lithium carbonate, and carbon with an appropriate amount of electrolyte salts. The process of the present invention includes the novel addition of the lithium carbonate and carbon to the positive electrode. After assembly and getting the battery up to temperature, e.g., such as about 450° C., the initial charge is put on the battery via the following reaction.

$Li_2CO_3 + C + Al \rightarrow Al/Li\ alloy + 2CO_2\uparrow$

The Al/Li alloy can be added by the amount of Al and $Li_2CO_3$ added to the cell.

By initially forming the battery in this manner, lithium is introduced from $Li_2CO_3$ in situ.

The process of the present invention includes the ability to allow one to handle only safe components and keep the battery in a discharged state until its initial use.

$Li_2CO_3$ is approximately 40 times less expensive than lithium material.

Accordingly, the process of the present invention provides a battery which is safer and significantly less expensive than conventionally methods available today.

Referring now to the sole FIGURE, a schematic diagram is shown of the starting composition and reaction of the novel process in accordance with the present invention.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

What is claimed is:

1. A method for making an aluminum-lithium negative electrode comprising:
   (a) admixing aluminum powder and lithium halide electrolyte salts to form an aluminum lithium halide mixture;
   (b) pressing said aluminum lithium halide mixture to form an aluminum lithium halide mixture negative electrode;
   (c) placing said aluminum lithium halide mixture negative electrode next to a separate electrode composed of MgO and lithium halide electrolyte salts; and
   (d) providing a positive electrode of iron sulfide, lithium carbonate, and carbon.

2. The method for making an aluminum-lithium negative electrode as set forth in claim 1, further comprising assembling said electrodes into a battery.

3. The method for making an aluminum-lithium negative electrode as set forth in claim 2, further comprising reacting lithium carbonate, carbon, and aluminum in situ in said battery to form an aluminum-lithium alloy negative electrode and carbon dioxide gas.

4. The method for making an aluminum-lithium negative electrode as set forth in claim 2, further comprising placing an initial charge on said battery by reacting lithium carbonate, carbon, and aluminum in situ in said battery to form aluminum-lithium alloy and carbon dioxide gas.

5. The method for making an aluminum-lithium negative electrode as set forth in claim 4, wherein said pressing said aluminum lithium halide mixture to form a negative electrode comprises cold pressing.

6. An aluminum-alloy negative electrode formed by:
   (a) admixing aluminum powder and lithium halide electrolyte salts to form an aluminum lithium halide mixture;
   (b) pressing said aluminum lithium halide mixture to form an aluminum lithium halide mixture negative electrode;
   (c) placing said aluminum lithium halide mixture negative electrode next to a separate electrode composed of MgO and lithium halide electrolyte salts; and
   (d) providing a positive electrode of iron sulfide, lithium carbonate, and carbon.

7. An aluminum-lithium negative electrode as set forth in claim 6, further comprising assembling said electrodes into a battery and reacting lithium carbonate, carbon, and aluminum in situ in said battery to form said aluminum-lithium alloy negative electrode.

8. An aluminum-lithium negative electrode as set forth in claim 7, wherein said pressing said aluminum lithium halide mixture to form a negative electrode comprises cold pressing.

9. A method for making an aluminum-lithium negative electrode comprising:
   (a) admixing aluminum powder and lithium halide electrolyte salts to form an aluminum lithium halide mixture;
   (b) cold pressing said aluminum lithium halide mixture to form an aluminum lithium halide mixture negative electrode;
   (c) placing said aluminum lithium halide mixture negative electrode next to a separate electrode composed of MgO and lithium halide electrolyte salts;
   (d) providing a positive electrode of iron sulfide, lithium carbonate, and carbon;
   (e) assembling said electrodes into a battery; and
   (f) reacting lithium carbonate, carbon, and aluminum in situ in said battery to form an aluminum-lithium alloy negative electrode and carbon dioxide gas.

\* \* \* \* \*